United States Patent [19]

Kite et al.

[11] Patent Number: 4,754,685
[45] Date of Patent: Jul. 5, 1988

[54] ABRASION RESISTANT BRAIDED SLEEVE

[75] Inventors: Joseph S. Kite, Glenmoore; Marie C. Tresslar, Plymouth Meeting, both of Pa.; Ronald L. Quell, Elkton, Md.

[73] Assignee: Raychem Corporation, Menlo Park, Calif.

[21] Appl. No.: 862,342

[22] Filed: May 12, 1986

[51] Int. Cl.⁴ .......................... D04C 1/02; D04C 1/06
[52] U.S. Cl. ................................. 87/9; 87/6; 87/8; 138/123
[58] Field of Search .................. 87/1, 5–9, 87/11, 13; 138/123–127; 174/110 SR, 110 N, 110 D, 120 SR, 121 SR, 124 R

[56] References Cited

U.S. PATENT DOCUMENTS

| | | | |
|---|---|---|---|
| 2,887,005 | 5/1959 | Fromm | 87/6 X |
| 2,977,839 | 4/1961 | Koch | 87/9 X |
| 3,078,755 | 2/1963 | Chace, Jr. | 87/6 X |
| 3,196,737 | 7/1965 | Wilkinson | 87/6 |
| 3,453,374 | 7/1969 | Natwick | 174/69 |
| 3,805,667 | 4/1974 | Orser | 87/8 X |
| 3,815,468 | 6/1974 | Matt et al. | 87/8 X |
| 3,844,195 | 10/1974 | Rhodes et al. | 87/8 X |
| 3,968,725 | 7/1976 | Holzhauer | 87/9 X |
| 4,084,065 | 4/1978 | Swenson | 87/6 X |
| 4,317,000 | 2/1982 | Ferer | 174/70 R |

FOREIGN PATENT DOCUMENTS

| | | |
|---|---|---|
| 117057 | 8/1984 | European Pat. Off. . |
| 822703 | 11/1951 | Fed. Rep. of Germany . |
| 1440850 | 4/1966 | France . |
| 1446114 | 6/1966 | France . |

*Primary Examiner*—John Petrakes
*Attorney, Agent, or Firm*—Herbert G. Burkard

[57] ABSTRACT

This invention provides a braided tubular sleeve having increased abrasion resistance. The braided tubular sleeve according to this invention have a resilient self-conforming "springback" property which enables the sleeve to conform in close contact with the surface of substrates, such as wire or cable bundles. The increased abrasion resistance is provided by braiding in with the resilient plastic yarns about one to about twenty ends of a resilient monofilament yarn such as nylon for every two ends of a resilient engineering plastic monofilament yarn such as polyester.

7 Claims, 1 Drawing Sheet

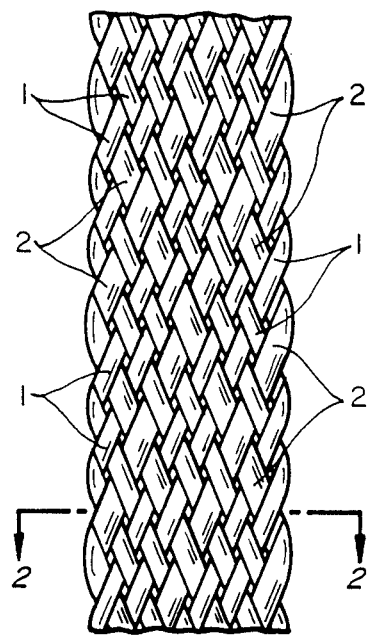
FIG_1
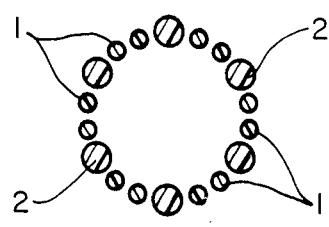
FIG_2

ABRASION RESISTANT BRAIDED SLEEVE

FIELD OF THE INVENTION

This invention relates to braided tubular sleeving which can be placed over various substrates such as wire bundles, pipes, conduits, electrical cables, air hoses and the like to provide certain environmental protection such as abrasion resistance and improved appearance.

BACKGROUND OF THE INVENTION

Some substrates such as electrical wire or cable are overbraided with wire to provide electrical shielding and other substrates such as hydraulic hoses are overbraided with wire or other materials to provide increased strength characteristics. In both instances the overbraiding can also provide increased abrasion resistance and durability for the product. However, in many instances it is impractical to overbraid such substrates with a desired exterior material. For example, electrical wires and cables are frequently installed in computer installations and particularly robotic installations wherein it is desirable to bundle a number of wires or cables together and retrofit an abrasion resistant flexible sleeving over the wire or cable bundle at the time of installation or some time after the original installation. In other circumstances it is desirable to protect other conduits such as air, water or other hoses from abrasion by retrofitting abrasion resistant sleeving over the hose at the time of installation or thereafter.

Braided tubular sleeving has conventionally been used as field installed protective sleeving. One such product is the EXPANDO self-fitting protective oversleeve made by Bentley-Harris Manufacturing Co., Lionville, Pennsylvania. The EXPANDO sleeving is a braided tubular product made from a resilient engineering plastic yarn such as a monofilament polyester. The EXPANDO oversleeve is particularly well suited for field installation over wire and cable bundles or harnesses, hoses, and the like because the sleeving has an open weave construction which enables the braided tube to expand to three times it original diameter when the braided tube is axially compressed. When the axial compression is released the braided tube tends to return to its original smaller diameter due to the resilient nature of the engineering plastic yarn from which it is braided. This "springback" property gives the braided sleeving the desirable characteristic of being self-fitting and conforming to any size substrate which is larger than the original diameter of the sleeve and to any irregular shape of wire and cable bundle. Once installed on the substrate the braided sleeving tends to remain tightly conformed to the exterior of the substrate. Since the braided open weave construction of the oversleeving is very flexible, the oversleeving easily conforms to any bending and flexing of the substrate thus providing continual abrasion protection for the substrate.

The engineering plastics from which the braided oversleeving has been made provides more than an adequate degree of abrasion resistance in most applications. However, it is desirable in some applications to have a higher degree of abrasion resistance. Therefore it is an objective of this invention to provide a braided tubular oversleeving which has increased abrasion resistance while retaining the springback properties desirable for such oversleeving.

SUMMARY OF THE INVENTION

This invention provides a braided tubular abrasion resistant sleeve comprising a resilient monofilament yarn and an abrasion resistant monofilament yarn present in a ratio from about one end of resilient yarn to two ends of abrasion resistant yarn and up to about ten ends of resilient yarn to one end of abrasion resistant yarn, wherein the resilient yarn comprises an engineering plastic having a tensile modulus of at least 100,000 and the abrasion resistant yarn comprises a polymeric material having a tensile modulus at least 50,000 less than the modulus of the resilient yarn.

The preferred resilient yarn comprises polyester and the preferred abrasion resistant yarn comprises nylon.

GENERAL DESCRIPTION OF THE DRAWINGS

FIG. 1 shows a braided sleeve according to the present invention.

FIG. 2 shows a cross-section of the braided sleeve according to a preferred embodiment of the present invention.

DESCRIPTION OF THE INVENTION

The braided sleeving provided by this invention can be formed on conventional circular braiders. The braid should not be formed so tight as to inhibit the flexibility of the braided sleeve or the ability of the sleeve to radially expand when axially compressed. In general it is preferred to have an open weave braid which provides maximum flexibility and maximum radial expansion, for example up to three times in diameter, to facilitate the ease of installation over various substrates, particularly irregular substrates such as wire bundles. Such radial expansion is particularly useful to enable the installer to slide the sleeving over connectors at the end of wire or cable bundles or fittings on the end of hoses then allow the sleeving to extend axially and contract radially to conform snugly with the wire or cable bundle or hose.

The resilient engineering plastic yarn useful in this invention should have sufficient tensile modulus to provide the desired springback characteristic in the braided sleeving. Preferably, the fiber or yarn used is polyester but it will be appreciated that any of the family of plastics known as engineering plastics are suitable for use in the sleeves of this invention. By engineering plastics, it is meant that the plastic has a tensile modulus of greater than 100,000 and preferably greater than 150,000 and more preferably at least 200,000. Examples of engineering plastics are the olefin polymers, of which some preferred olefin polymers are high density polyethylene, polypropylene, polybutene-1, poly 4-methyl pentene and fluorinated polyolefins such as ethylenetrifluorochloroethylene copolyers, ethylenetetrafluoroethylene copolymers, and vinylidene fluoride polymers, especially polyvinylidene fluoride, and blends thereof, for example, the fluorinated olefin blends as described in British patent No. 1,120,131; polyesters, for example, polyethylene terephthalate, polytetramethylene terephathalate for example those treated as described in U.S. Pat. Nos. 3,968,015; 4,073,830 and 4,113,594; polyphenylene-oxide and -sulphide, blends of polyethylene oxide with polystyrene, silicone-carbonate block copolymers, polyketones, such as polyarylether ketones, for example, those described in U.S. Pat. Nos. 3,953,400; 4,024,314; 4,229,564; 3,751,398; 3,914,298; 3,965,146; and 4,111,908; polysulphones, for example, polyaryl sulphones, polyarylether sulphones, polyetherimides, for example those described in U.S. Pat. No. 3,847,867, polycarbonates especially those derived from bis phenol-A, polyamides, especially those described in U.S. Pat. Nos. 3,551,200 and 3,677,921, epoxy resins and blends of one or more of the above-mentioned polymeric materials either with each other or with other polymeric materials. Additional discussion of such materials is found in British specification No. 1,529,351. The disclosures of the above patents and specifications are incorporated herein by reference.

The abrasion resistant fiber or yarn will have tensile modulus at least 5,000 lower than the resilient yarn. Thus the abrasion resistant yarn will be comparatively flexible and will not interfere with the resilient nature of the resilient fiber or yarn which provides the springback properties desirable in the sleeves of the present invention. Preferably the fiber or yarn used as the abrasion resistant material is nylon but it will be appreciated that any of the family of polymeric materials having abrasion resistance and a low modulus relative to the resilient engineering plastic yarn will be suitable for use in the sleeves of this invention. By abrasion resistant material it is meant that the fiber or yarn be formed of a polymer which has sufficient abrasion resistance to enhance the abrasion resistance of the resilient engineering plastic yarn and have sufficiently low modulus to not interfere with the springback characteristic of the sleeve. Examples of such materials are nylon 6, nylon 6/6, and other nylon polymers used in their normal ambient humidity conditions. When the engineering plastic used as the resilient yarn in the sleeves of this invention has a very high modulus, other engineering plastics having a modulus at least 50,000 less can be used as the abrasion resistant yarn. For example, when the resilient engineering plastic is a very high modulus material such as polyethylene terephthalate then the abrasion resistant yarn can be a lower modulus material such as high density polyethylene or polypropylene. One skilled in the art following the disclosure of this application can select the materials desired for the desired sleeve properties.

It is generally preferred but is not essential that the abrasion resistant yarn have a melting point at least as high as the resilient engineering plastic yarn. For example, when a polyester melting point in the range of 265° C. is used, it is desirable to use a nylon that melts in the range of 270° C.

The proportions of the resilient engineering plastic yarns and the abrasion resistant yarns present in the braided sleeving made according to the present invention may vary over a wide range provided that the resilient springback property of the braided sleeve is sufficient to provide acceptable conformance of the sleeve to the shape of the substrate desired to be protected. The stronger and stiffer engineering plastics used as the resilient yarn may be present in a lower proportion to the abrasion resistant yarn as compared to when the engineering plastic is a less resilient yarn. In general the ratio of the two types of yarns according to the present invention may range from about one end of resilient yarn to two ends of abrasion resistant yarn and up to about ten ends of resilient yarn to one end of abrasion resistant yarn; however is preferred that the ratio be between about 1:1 and 3:1 and a most preferred ratio is about 2:1, i.e. two ends of resilient yarn to one end of abrasion resistant yarn.

The resilient yarn and the abrasion resistant yarn may each be fed off of separate bobbins or carriers on the braider or may be combined in desired ratios on the carriers. For example when two ends of polyester are used with one end of nylon every third carrier would be nylon and the others would be polyester, or the two ends of polyester and one end of nylon may be loaded on each carrier. When fed into the braider the yarns in the pre-loaded ratio are braided to form the desired sleeve. The latter is the preferred method.

It is generally preferred that the abrasion resistant monofilament yarn should have a larger diameter than the resilient yarn in order to provide a profile to the sleeve wherein the abrasion resistant yarn provides, in effect, a raised surface of the braided sleeve and the resilient yarns have a lower profile and are thereby protected from exterior abrasion by the raised abrasion resistant yarns. In general the resilient engineering plastic yarns will have a size in the range of 6 mils to about 15 mils and the abrasion resistant yarn will have a size in the range of about 8 mils to about 20 mils, wherein the abrasion resistant yarn is preferably at least 2 to 6 mils larger in diameter than the resilient yarn. It has been found that using polyester and nylon monofilament yarns in a ratio of two ends of polyester to one end of nylon the abrasion resistance was improved twofold over the polyester sleeve when 10 mil polyester and 12 mil nylon was used. However, when 10 mil polyester was used with 15 mil nylon in the same ratio the improvement in abrasion resistance was sixfold over the polyester per se sleeve.

Referring now to the figures, a preferred embodiment of this invention can be illustrated. In FIG. 1 a braided tubular sleeve is illustrated wherein two ends of polyester engineering plastic monofilament yarns, 1, having a diameter of 10 mils are braided with one end of nylon monofilament yarn having a diameter of 15 mils. FIG. 2 better illustrates the profiled aspect of the larger diameter of the abrasion resistant nylon yarns, 2, which better protect the resilient polyester yarns 1.

In a preferred embodiment, a half-inch I.D. sleeve is braided from two ends of a 10 mil monofilament polyester available under the tradename of "Estralyn" from Johnson Filament in Williston, Vermont, having a melt temperature of 265° C., and one end of a 15 mil monofilament nylon available under the tradename "Preslyn" from Johnson Filament and having a melt temperature of 270° C. The two ends of polyester and one end of nylon are loaded on each of 48 carriers on a braider and braided into the half-inch I.D. sleeve. Thus the final sleeve has 96 ends of 10 mil polyester and 48 ends of 15 mil nylon. This sleeve has outstanding abrasion resistance and excellent springback making it a superior product for wire, cable, hose, and other substrate protection.

We claim:

1. A braided tubular abrasion resistant sleeve comprising a resilient monofilament yarn and an abrasion resistant monofilament yarn present in a ratio from about one end of resilient yarn to two ends of abrasion resistant yarn and up to about ten ends of resilient yarn to one end of an abrasion resistant yarn wherein the resilient yarn comprises an engineering plastic having a tensile modulus of at least 100,000 and the abrasion resistant yarn comprises a polymeric material having a tensile modulus at least 50,000 less than the modulus of the resilient yarn, wherein the abrasion resistant yarn is larger diameter than the resilient yarn.

2. A braided tubular sleeve according to claim 1 wherein the ratio of ends of resilient yarn to the ends of abrasion resistant yarn is between about 3:1 and 1:1.

3. A braided tubular sleeve according to claim 2 wherein the ratio of ends of resilient yarn to ends of abrasion resistant yarn is about 2 to 1.

4. A braided tubular sleeve according to claim 3 wherein the resilient yarn is polyester and the abrasion resistant yarn is nylon.

5. A braided tubular sleeve according to claim 2 wherein the resilient yarn is polyester and the abrasion resistant yarn is nylon.

6. A braided tubular sleeve according to claim 1 wherein the resilient yarn is polyester and the abrasion resistant yarn is nylon.

7. A braided tubular sleeve according to claim 6 wherein the nylon yarn is at least 2 mils larger in diameter than the polyester yarn.

* * * * *